United States Patent [19]

Suzuki et al.

[11] Patent Number: 5,184,847
[45] Date of Patent: Feb. 9, 1993

[54] LIQUID CRYSTAL COMPOUNDS

[75] Inventors: Yoshiichi Suzuki; Hiroyuki Mogamiya; Ichiro Kawamura, all of Tokyo, Japan

[73] Assignee: Showa Shell Sekiyu Kabushiki Kaisha, Tokyo, Japan

[21] Appl. No.: 785,877

[22] Filed: Nov. 4, 1991

Related U.S. Application Data

[63] Continuation of Ser. No. 533,813, Jun. 6, 1990, abandoned.

[30] Foreign Application Priority Data

Jun. 6, 1989 [JP] Japan .................................. 1-143472

[51] Int. Cl.$^5$ ...................... C09K 19/12; C09K 19/20; C07C 69/76
[52] U.S. Cl. .......................... 252/299.65; 252/299.01; 252/299.66; 252/299.67; 560/65; 560/73; 560/102; 560/59; 560/61; 560/62; 560/64
[58] Field of Search ............. 252/299.01, 299.1, 299.6, 252/299.64, 299.65, 299.66, 299.67; 560/55, 59, 61, 62, 64, 65, 77, 102

[56] References Cited

U.S. PATENT DOCUMENTS

| | | | |
|---|---|---|---|
| 4,918,213 | 4/1990 | Nohira et al. | 558/271 |
| 4,921,632 | 5/1990 | Nakamura | 252/299.1 |
| 4,973,738 | 11/1990 | Suzuki | 560/80 |

FOREIGN PATENT DOCUMENTS

| | | |
|---|---|---|
| 327349 | 8/1989 | European Pat. Off. . |
| 63-307837 | 12/1988 | Japan . |
| 64-3154 | 1/1989 | Japan . |
| 1-139551 | 6/1989 | Japan . |
| 1-213390 | 8/1989 | Japan . |
| 2-40346 | 2/1990 | Japan . |
| 2-153322 | 6/1990 | Japan . |
| 2-173724 | 7/1990 | Japan . |
| 2182037 | 5/1987 | United Kingdom . |

OTHER PUBLICATIONS

Y. Suzuki et al., New Fluorine-Containing Ferroelectric Liquid Crystal Compounds With Large Spontaneous Polarization And Fast Switching Time, 12th I.L.C.C. Abs. No. SY02 (Aug. 15-19, 1988).
Patent Abstracts of Japan, vol. 13, No. 174 (C-589) [3522]-Apr. 25, 1989.
Liquid Crystals, vol. 6, No. 2, pp. 167-174 (Taylor and Francis Ltd., 1983) (p. 167-note paragraph 1, p. 168-note paragraph 2, p. 169-note FIG. 3).
Patent Abstracts of Japan, vol. 14, No. 254 (C-724)[419-7]-May 31, 1990.
Japanese Journal of Applied Physics vol. 27, No. 5, May, 1988, pp. L729-L732, Tristable Switching in Surface Stabilized Ferroelectric Liquid Crystals with a Large Spontaneous Polarization, A. D. L. Chandani.
Liquid Crystals, 1989, vol. 6, No. 2, 167-174, New fluorine-containing ferroelectric liquid crystal compounds showing tristable switching by Y. Suzuki.

Primary Examiner—Robert L. Stoll
Assistant Examiner—Shean C. Wu
Attorney, Agent, or Firm—Cushman, Darby, Cushman

[57] ABSTRACT

Ferrelectric chiral smetic liquid crystal compound are provided which have the formula, for example

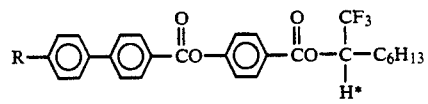

or

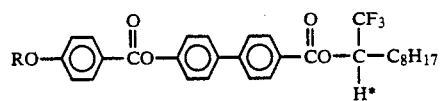

wherein R is a $C_{1-20}$ alkyl group.

4 Claims, 5 Drawing Sheets

LIQUID CRYSTAL COMPOUNDS

This is a continuation of application Ser. No. 07/533,813, filed on Jun. 6, 1990, which was abandoned.

The present invention relates to ferroelectric chiral smectic liquid crystal compounds which are used for an indicative element or a photoelectric element utilizing response to an electric field. Furthermore, the present invention relates to ferroelectric liquid crystal compounds having three stable molecular orientations which are also used for an indicative element or a photoelectric element utilizing response to an electric field.

DESCRIPTION OF RELATED ART

There are electrooptical devices which employ nematic liquid crystals such as DSM, TN, G-H and STN. Useful applications of these devices are restricted, since response speed is as small as a few meter second to some ten meter second. This is due to the fact that torque for moving molecules is not so large, since the torque is mainly based on anisotrophy of permittivity. Ferroelectric liquid crystals have been proposed which have response speed as large as a few $\mu$ second to some ten $\mu$ second and have large torque on the basis of $Ps \times E$ where Ps is a spontaneous polarization and E is an applied electric field (Meyer et al, Le Journal de PHysique 36, 1975, L-69). Furthermore, there is proposed another ferroelectric liquid crystal (JP 63-307837) which is silent on tristable state hereinafter referred to.

Figure 1:
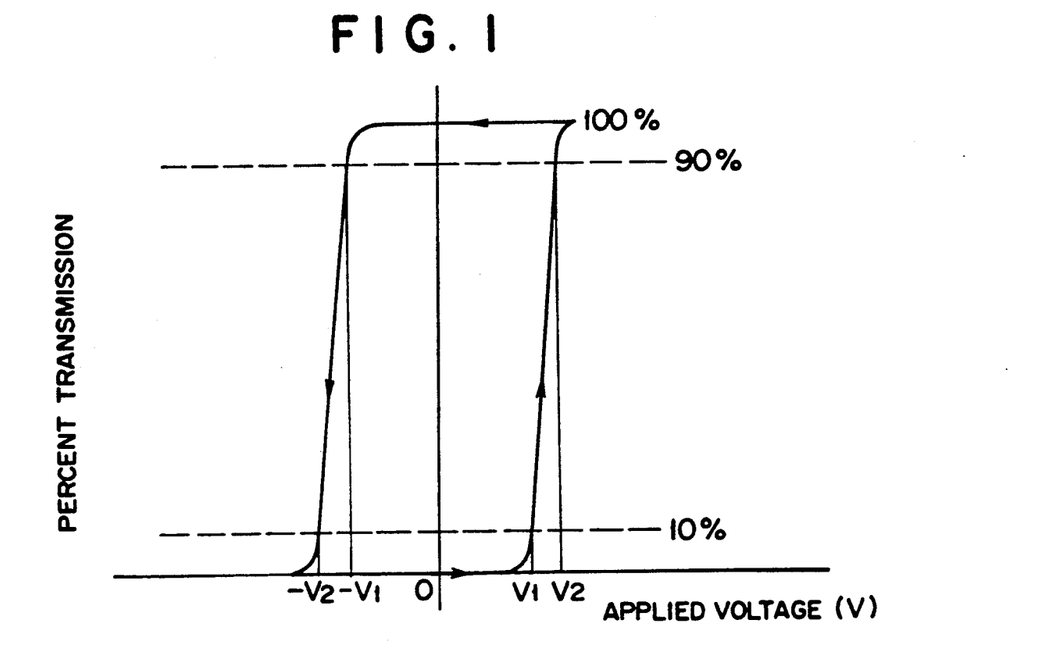
FIG. 1 is an ideal but hypothetical hysteresis of bistable liquid crystals which have not yet been obtained.
Figure 2:
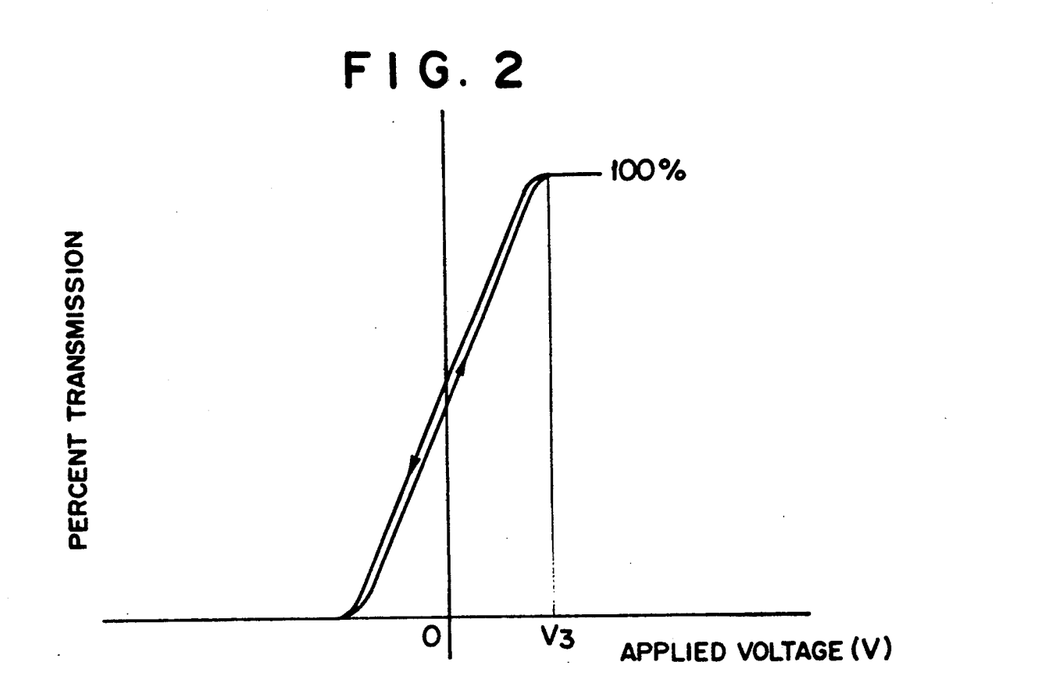
FIG. 2 is hysteresis of bistable liquid crystals actually prepared.

One of high speed electrooptical devices which employ ferroelectric liquid crystals is that where a helical structure is released by wall force and a change is brought about in two molecular orientations which become parallel to the wall by use of polarity of applied electric fields (JP 56-107216). This is based on a premise that there is a compound having an ideal bistable state which show such electric field response wave as shown in FIG. 1. However, compounds which have been actually synthesized have no such electric field response wave as in FIG. 1 but they exhibited the response as shown in FIG. 2. When a compound having response wave as in FIG. 2 is used, for instance, in a switching circuit of light, desired result is hardly obtained by only a change in applied electric voltage between "ON" and "OFF", since percent transmission slowly changes according to the change of applied electric voltage from a $\ominus$ side to a $\oplus$ side. In addition, bistable liquid crystals which have been synthesized hardly form a monodomain texture, i.e., an ideal molecular orientation at $S_c^*$ phase stage where no electric field is applied to, but cause disclination or twist or irregularity in molecular orientation. It is very difficult to have ideal bistable orientation expressed in a large area. Another difficulty is that decrease in contrast or narrowing a field of view often appears in dynamic driving, since threshold voltage where luminance varies at a given level is small. The other difficulty is that there is no memory effect, since the bistable state liquid crystals actually synthesized have no hysteresis as in FIG. 1 but that as in FIG. 2. It is necessary to apply electric voltage of v3 in FIG. 2 throughout or to apply high frequency throughout, in order to have liquid crystals maintained stable response at $S_c^*$ phase. Both lose a large amount of energy. Although high speed electrooptical devices liquid crystals are expected where strong combination between applied electric fields and molecular orientation brought about from ferroelectric liquid crystals is employed, any conventional devices leave many problems unsolved.

BRIEF DESCRIPTION OF THE DRAWINGS

In the accompanying drawings.

SUMMARY OF THE INVENTION

Figure 3:
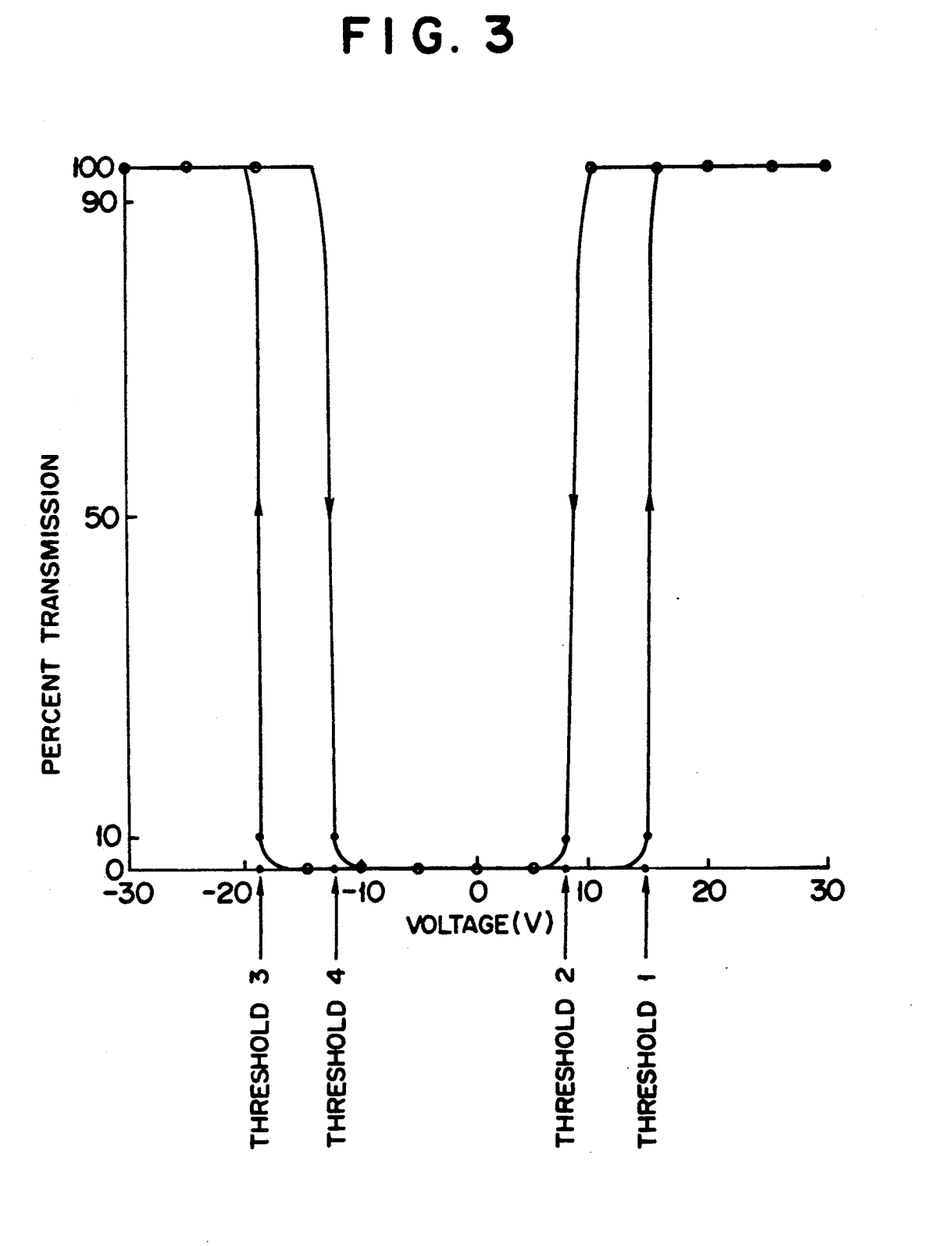
FIG. 3 is hysteresis of the present tristable crystals, where in FIGS. 1 to 3, a horizontal axis and a vertical axis show applied voltage and percent transmission (%), respectively, FIG. 4, A is applied triangular wave and B, C and D are optical response features of commercially available nematic liquid crystals, bistable liquid crystals which had been prepared and the present tristable liquid crystals, respectively.

The present invention provides novel liquid crystal compounds which are used in liquid crystal electrooptical devices employing a tristable liquid crystals. The devices are able to show stable molecular orientation which expresses clear contrast in a field where no electric voltage is applied to, clear threshold and clear hysteresis as in FIG. 3. The devices are also ready to allow dynamic drive and make it possible to respond at high speed.

Figure 4:
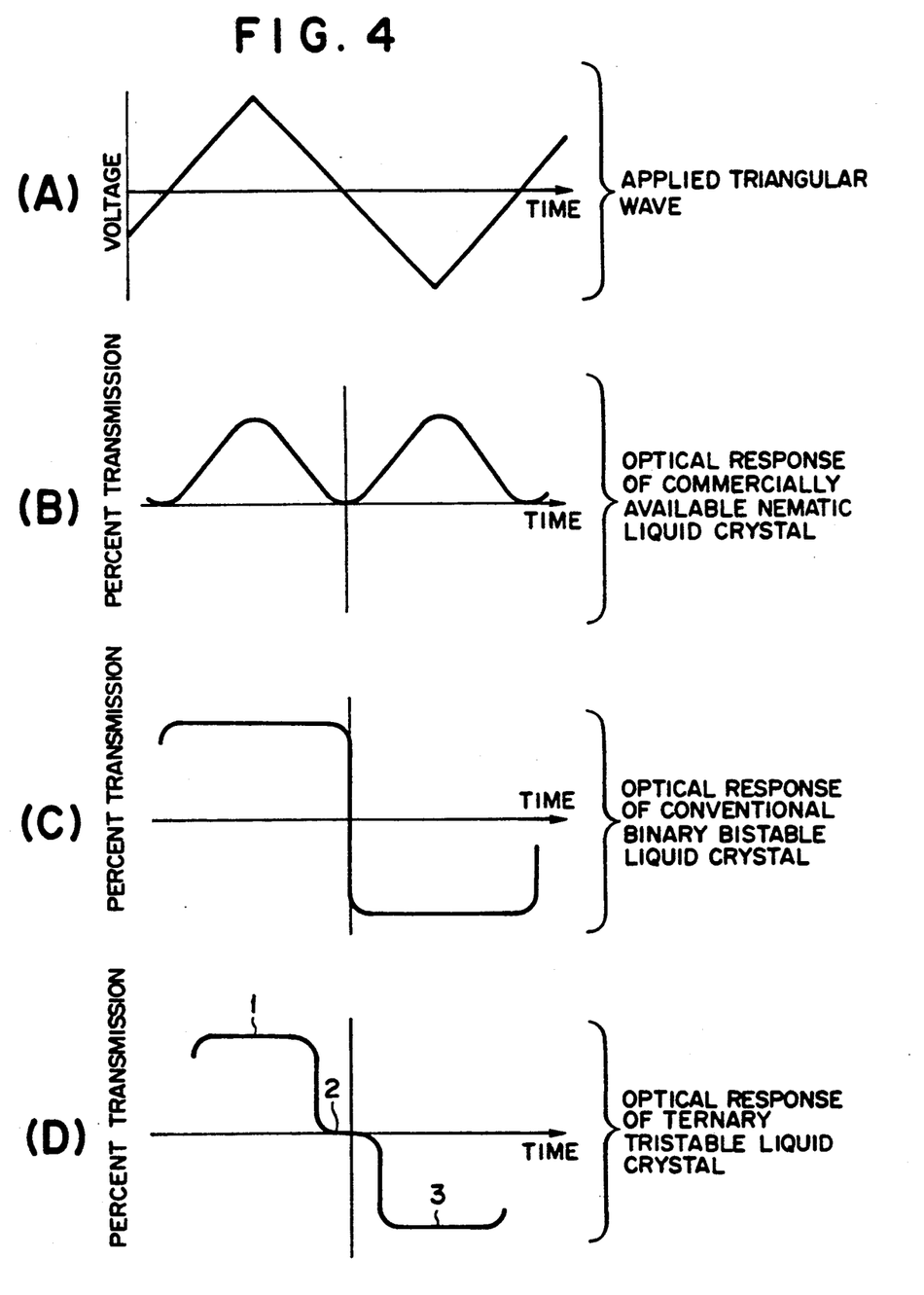

A feature of the resent novel ferroelectric liquid crystals lies in a novel tristable state which is greatly far from a bistable state chiral smectic C phase or $S_c^*$ phase. The tristable state herein referred to means that, when voltage in the form of a triangular wave as in FIG. 4 A is applied to liquid crystal electrooptical devices where ferroelectric liquid crystals are laid between the first electrode substrate plate and the second electrode substrate plates which is apart at a given space from the first one and electric voltage for electric field is applied to the both electrode substrate plates, the second stable state in FIG. 4 D, 1 which is different from the first stable state in FIG. 4 D, 2 appears in one of the directions of electric field and the third stable state in FIG. 4 D, 3 which is different from the second as well as the first stable state appears in the other direction of electric field (JP 63-70212). On the other hand, commercially available conventional nematic liquid crystals and bistable state liquid crystals do not have such three stable states as in FIG. 4 (B) and (C).

The present tristable state ferroelectric liquid crystals display an epoch-making effect in view of the conventional nematic liquid crystals. A process for preparing the former is simple and not expensive and a display having a large size can be produced. All necessary for the former is a simple matrix indicative element. On the other hand, the latter conventional nematic liquid crystals need such a greatly complex system as active matrix and complex and expensive processes. A display of large size is hardly produced.

DETAILED DESCRIPTION OF THE PREFERRED EMBODIMENTS

According to the present invention, a liquid crystal compound having the formula given below is provided.

wherein Ra is a $C_{1-20}$ alkyl group or a $C_{1-20}$ alkoxy group, Rb is a $C_{1-20}$ normal alkyl group, a branched alkyl group, an aralkyl group or an alkoxy group, X is a group or a group, Y is a group or a group, Z is a fluorine-containing alkyl group or a halogen substituted group thereof, m is an integer from one to three, n is zero or an integer from one to two, p is zero or one but, when n is zero, p is zero, * shows an optically active center.

Preferable alkyl and alkoxy groups represented by Ra and Rb have from 3 to 16 carbon atoms. Y is preferably and Z is preferably $CF_3$.

Preferable compounds are

-continued wherein R is a $C_{3-16}$ alkyl group.

Synthesis of the Compounds (1) Optical active 4-(1,1,1-trifluoro-2-alkyloxycarbonyl)phenyl 4-n-alkyloxybenzoate or biphenylcarboxylate 4-Benzyloxybenzoic acid chloride is allowed to react with optically active 1,1,1-trifluoro-2-alkanol to prepare 1,1,1-trifluoro-2-alkyl 4-benzyloxybenzoate which is subjected to hydrogenation to obtain 1,1,1-trifluoro-2-alkyl 4-hydroxybenzoate. The alkyl ester is ten allowed to react with 4-n alkyloxyphenyl or biphenyl carboxylic acid chloride to obtain the titled compound.

(2) Optically active 4-alkyloxybiphenyl-4-(1,1,1-trifluoro-2-alkyloxycarbonyl)benzoate Terephthalic acid chloride is allowed to react with optically active 1,1,1-trifluoro-2-alkanol to prepare 1,1,1-trifluoroalkylterephthalate which is allowed to react with 4-alkyloxy-4'-hydroxybiphenol to obtain the titled compound.

The following examples explain the present invention.

EXAMPLE 1

1) Synthesis of 1,1,1-trifluoro-2-decyl-4-benzyloxybenzoate

To a solution of 4-benzyloxybenzoic acid chloride (1.23 g) in methylene chloride (10 ml) was added by little and little under ice-cooling a solution of optically active 1,1,1-trifluoro-2-decanol (0.96 g), dimethylaminopyridine (0.55 g) and triethylamine (0.48 g) in methylene chloride (20 ml). The mixture was left to stand overnight at room temperature in order to effect a reaction before the mixture obtained was poured in ice-water. Extraction was effected with methylene chloride and the extracted phase was washed with dilute aqueous hydrochloric acid solution, water, 1N aqueous sodium carbonate solution and water in due order before it was dried over anhydrous magnesium sulfate. The solvent was distilled off to obtain a crude product which was purified by toluene/silica gel column chromatography and further recrystallized from ethanol to obtain the titled compound (1.84 g).

2) Synthesis of 1,1,1-trifluoro-2-decyl-4-hydroxybenzoate

A solution of the compound obtained in 1) in ethanol (15 ml) was subjected to hydrogenation under hydrogen atmosphere in the presence of 10 % Pd on carbon (0.36 g) to obtain the titled compound (1.43 g).

3) Synthesis of 4-(1,1,1-trifluoro-2-decyloxycarbonyl)phenyl 4'-n-decyloxybiphenyl-4-carboxylate 4-n-Decyloxybiphenyl-4-carboxylic acid (1.20 g) with excess thionyl chloride was heated for six hours under refluxing. Thionyl chloride unaltered was distilled off to obtain 4-n-decyloxydiphenylcarboxylic acid chloride.

To a solution of the said acid chloride in methylene chloride (12.0 ml) was added by little and little under ice-cooling a solution of 1,1,1-trifluorodecyl 4-hydroxybenzoate prepared in 2) above (1.00 g), triethylamine (0.32 g) and dimethylaminopyridine (0.37 g) in methylene chloride (30 ml). The mixture was left to stand overnight at room temperature, before the mixture was poured in ice water.

Extraction was carried out with methylene chloride and the extracted phase was washed with dilute aqueous hydrochloric acid solution, water, aqueous sodium carbonate solution, and water in due order before it was dried over anhydrous sodium sulfate. The solvent was distilled off to obtain a crude product which was purified by toluene/silica gel column chromatography until the optically active titled compound (1.53 g) was obtained.

Phase transition temperature of the product was observed after the product was recrystallized from absolute ethanol.

EXAMPLE 2

4-n-(1,1,1-trifluoro-2-decyloxycarbonyl)phenyl 4'-n-octyloxybiphenyl-4-carboxylate

EXAMPLE 3

4-n-(1,1,1-trifluoro-2-decyloxycarbonyl)phenyl 4'-n-nonyloxybiphenyl-4-carboxylate

EXAMPLE 4

4-n-(1,1,1-trifluoro-2-decyloxycarbonyl)phenyl 4'-n-undecyloxybiphenyl-4-carboxylate

EXAMPLE 5

4-n-(1,1,1-trifluoro-2-decyloxycarbonyl)phenyl 4'-n-dodecyloxybiphenyl-4-carboxylate Example 1s were repeated except that 4'-n-octyloxybiphenyl-4-carboxylic acid, 4'-n-nonyloxybiphenyl-4-carboxylic acid, 4'-n-undecyloxybiphenyl-4-carboxylic acid and 4'-n-dodecyloxybiphenyl-4-carboxylic acid were used in place of the 4-n-decyloxybiphenylcarboxylic acid to obtain the titled compounds, respectively.

Specific rotations $[\alpha]^{20}{}_D$ and phase transition temperatures of the objective compounds of the present invention are shown below.

| Specific rotation(°) | | Phase transition temperature (°C.) |
|---|---|---| n = 8  +33.2  Cry $\underset{<67.5}{\overset{79.2>}{\rightleftarrows}}$ S*(3) $\underset{<103}{\overset{104>}{\rightleftarrows}}$ S*c $\underset{<105.0}{\overset{105.5>}{\rightleftarrows}}$ S$_A$ $\underset{<113.5}{\overset{114.0>}{\rightleftarrows}}$ Iso n = 9  +32.0  Cry $\underset{<31.7}{\overset{63.8>}{\rightleftarrows}}$ S*(3) $\underset{<96}{\overset{96.6>}{\rightleftarrows}}$ S*c $\underset{<98}{\overset{98>}{\rightleftarrows}}$ S$_A$ $\underset{<105.1}{\overset{105.5>}{\rightleftarrows}}$ Iso n = 10 +30.8  Cry $\underset{<10.0}{\overset{44.6>}{\rightleftarrows}}$ S*(3) $\underset{<95.0}{\overset{95.8>}{\rightleftarrows}}$ S$_A$ $\underset{<100.3}{\overset{100.5>}{\rightleftarrows}}$ Iso n = 11 +30.5  Cry $\underset{<21.2}{\overset{45.8>}{\rightleftarrows}}$ S*(3) $\underset{<91.6}{\overset{91.6>}{\rightleftarrows}}$ S$_A$ $\underset{<95.9}{\overset{95.9>}{\rightleftarrows}}$ Iso n = 12 +31.9  Cry $\underset{<30.4}{\overset{56.5>}{\rightleftarrows}}$ S*(3) $\underset{<90.4}{\overset{90.4>}{\rightleftarrows}}$ S$_A$ $\underset{<92.8}{\overset{92.8>}{\rightleftarrows}}$ Iso The phase transition temperatures were measured by DSC and hot stage microscope-observation. Herein S*(3) means phase of ternary tristable state.

EXAMPLE 6

4-(1,1,1-trifluoro-2-decyloxycarbonyl)phenyl 4'-n-octylbiphenyl-4-carboxylate

EXAMPLE 7

4-(1,1,1-trifluoro-2-decyloxycarbonyl)phenyl 4'-n-nonylbiphenyl-4-carboxylate

EXAMPLE 8

4-(1,1,1-trifluoro-2-decyloxycarbonyl)phenyl 4'-n-decylbiphenyl-4-carboxylate

EXAMPLE 9

4-(1,1,1-trifluoro-2-decyloxycarbonyl)phenyl 4'-n-undecylbiphenyl-4-carboxylate

Example 1s were repeated except that 4'-n-octylbiphenyl-4-carboxylic acid, 4'-n-nonylbiphenyl-4-carboxylic acid, 4'-n-decylbiphenyl-4-carboxylic acid and 4'-n-undecylbiphenyl-4-carboxylic acid were used in place of the 4-n-decyloxybiphenyl-4-carboxylic acid to obtain the titled compounds, respectively.

Specific rotations [α]$^{20}_D$ and phase transition temperatures of the objective compounds of the present invention are shown below.

| Specific rotation(°) | | Phase transition temperature (°C.) |
|---|---|---| n = 8  +32.7  Cry $\underset{<31.3}{\overset{41.8>}{\rightleftarrows}}$ S*(3) $\underset{<62}{\overset{63>}{\rightleftarrows}}$ S*c $\underset{<62.5}{\overset{64.0>}{\rightleftarrows}}$ S$_A$ $\underset{<67.5}{\overset{68.2>}{\rightleftarrows}}$ Iso n = 9  +33.1  Cry $\underset{<16.8}{\overset{32.1>}{\rightleftarrows}}$ S*(3) $\underset{<61.8}{\overset{61.8>}{\rightleftarrows}}$ S$_A$ $\underset{<65.0}{\overset{65.3>}{\rightleftarrows}}$ Iso -continued The phase transition temperatures were measured by DSC and hot stage microscope-observation.

Specific rotations $[\alpha]^{20}_D$ and phase transition temperatures of the objective compounds of the present invention are shown below.

Specific rotation(°)    Phase transition temperature (°C.)

The phase transition temperature were measured by DSC and hot stage microscope-observation.

EXAMPLE 10

4-(1,1,1-trifluoro-2-octyloxycarbonyl)phenyl 4'-n-nonylbiphenyl-4-carboxylate

EXAMPLE 11

4-(1,1,1-trifluoro-2-octyloxycarbonyl)phenyl 4'-n-decylbiphenyl-4-carboxylate

EXAMPLE 12

4-(1,1,1-trifluoro-2-octyloxycarbonyl)phenyl 4'-n-undecylbiphenyl-4-carboxylate

Example 1s were repeated except that optically active 1,1,1-trifluoro-2-octanol was used in place of the 1,1,1-trifluoro-2-decanol used in example 1,1, and 4'-n-nonylbiphenyl-4-carboxylic acid, 4'-n-decylbiphenyl-4-carboxylic acid and 4'-n-undecylbiphenyl-4-carboxylic acid were used in place of the 4-n-decyloxybiphenylcarboxylic acid to obtain the titled compounds, respectively.

EXAMPLE 13

Synthesis of 4'-n-dodecyloxybiphenyl-(4) 4-(1,1,1-trifluoro-2-decyloxycarbonyl)benzoate (1) Synthesis of mono-ester of 1,1,1-trifluoro-2-decylterephthalic acid To a solution of terephthalic acid chloride (11.2 g) in methylene chloride (50 ml) were added by little and little under ice-cooling optically active 1,1,1-trifluoro-2-decanol (10.0 g) and pyridine (13.0 g). The mixture was left to stand overnight at room temperature and washed with dilute aqueous hydrochloric acid solution, water, 1N aqueous sodium bicarbonate solution and water, in due order. The organic layer was separated, dried over anhydrous magnesium sulfate and subjected to distillation under reduced pressure to remove the solvent. The crude product obtained was purified by toluene/silica gel chromatography and then recrystallized from ethanol to obtain the titled compound (3.3 g).

2) 4'-n-Dodecyloxybiphenyl-(4) 4-(1,1,1-trifluoro-2-decyloxycarbonyl)benzoate 1,1,1-Trifluoro-2-decylterephthalate (3.3 g) obtained in 1), 4-dodecyloxy-4'-hydroxybiphenyl (3.9 g), dicyclohexylcarbodiimide (3.19 g) and dimethylaminopyridine (0.3 g) were poured in tetrahydrofuran (100 ml) and the mixture was left to stand overnight at room temperature.

Some amount of the tetrahydrofuran was distilled off under reduced pressure and the residue was poured in ice water. Extraction was made with methylene chloride and the extract was washed with 1N aqueous sodium bicarbonate solution, water, dilute aqueous hydrogen chloride solution and water, in due order, until the extract was neutral. The extract was dried over anhydrous sodium sulfate and was subjected to distillation to remove the solvent to obtain a crude product which was purified by toluene/silica gel chromatography and recrystallized from ethanol to obtain the optically active titled compound (1.3 g).

Specific rotation $[\alpha]^{20}_D = +28.8°$

Phase transition temperature (° C.) by DSC and hot stage microscope-observation

EXAMPLE 14

4-'-(1,1,1-trifluoro-2-octyloxycarbonyl)biphenyl-(4) 4-n-octyloxybenzoate

4(1,1,1-trifluoro-2-octyloxycarbonyl)-4'-hydroxybiphenyl (0.5 g) was allowed to react with n-4-octyloxybenzoic acid (0.33 g) in the presence of dicyclocarbodiimide (0.3 g), a few pieces of dimethylaminopyridine and tetrahydrofuran (30 ml) to obtain a crude product (0.4 g), which was purified by silica gel column chromatography (hexane:ethyl acetate=10:0.5) and then recrystallized from ethanol to obtain optically active titled compound (0.4 g).

Specific rotation $[\alpha]^{20}_D = 39.2$

EXAMPLE 15

4-n-octyloxyphenyl 4'-(1,1,1-trifluoro-2-octyl-oxycarbonyl)biphenyl-4-carboxylate To a solution of 4,4'-biphenyldicarboxylic acid dichloride (1.3 g) and 4-n-octoxyphenol (1.0 g) in methylene chloride (40 ml) were added triethylamine (0.5 g) and dimethylaminopyridine (0.032 g). The mixture was stirred for 24 hours at room temperature before it was poured in water. Extraction was made with methylene chloride and the extract was washed with dilute aqueous hydrochloric acid solution, water, dilute aqueous sodium carbonate solution and water, in due order, and dried over anhydrous magnesium sulfate. After the solvent was distilled off, the residue was purified by silica gel column chromatography (developer : hexane : ethyl acetate=10 : 0.5) and recrystallized from ethanol to obtain the titled compound (0.8 g)

Specific rotation $[\alpha]^{20}_D = +41.0$

Phase transition temperature by DSC and hot stage microscope-observation

EXAMPLE 16

In a liquid crystal cell having 2.9 μm of cell thickness in which a rubbed polyimide oriented film was placed on an ITO electrode substrate plate was packed the liquid crystal compound which is obtained in Example 1 and is in the form of an isotropic phase to prepare a liquid crystal thin film cell.

The cell was slowly cooled with a rate of 0.1 to 1.0° C./min. until SA phase was oriented. Rectangular wave (±30 V, 10 Hz) was applied to in order to detect electrooptical response by a polarizing microscope with photomultiplyer.

Figure 5:
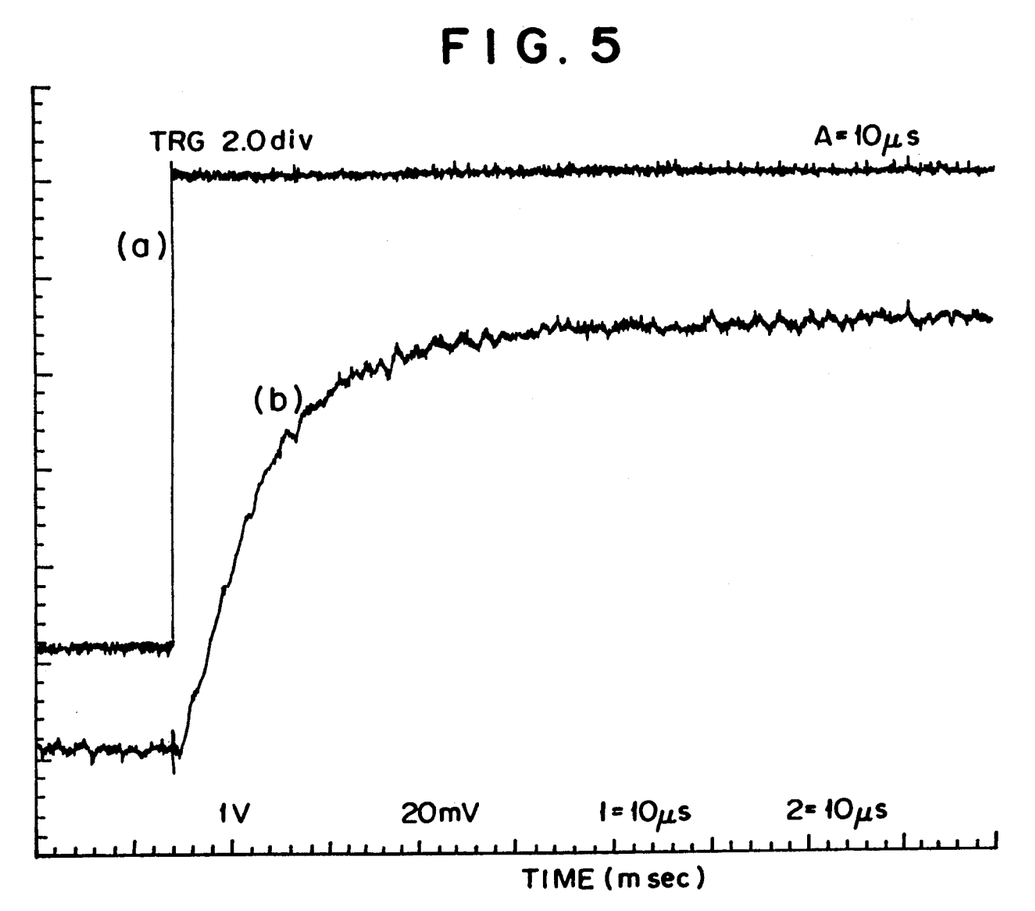
FIG. 5 shows electroclinic effect, wherein (a) is AC voltage and (b) is change of percent light transmission (transmittance) against the AC voltage (a) above.

Electroclinic effect (b) which was optically responsible against applied field (a) was observed at the SA phase. The same effect as above was observed as to the compounds of examples 2-15.

EXAMPLE 17

A liquid crystal cell prepared in the same manner as in example 16 was put in a polarizing microscope with photomultiplyer where two polarizing plate were crossed with a right angle so that an angle between a parallel axis of molecule and a polarizer was 22.5°. The liquid crystal cell was slowly cooled with a rate of 0.1° to 1.0° C./min. to an S*(3) phase. Further cooling showed a change as in FIG. 6 where triangular wave voltage (a) of ±30 V, 10 Hz was applied to within the temperature range of 95.0° to 10.0° C.

Figure 6:
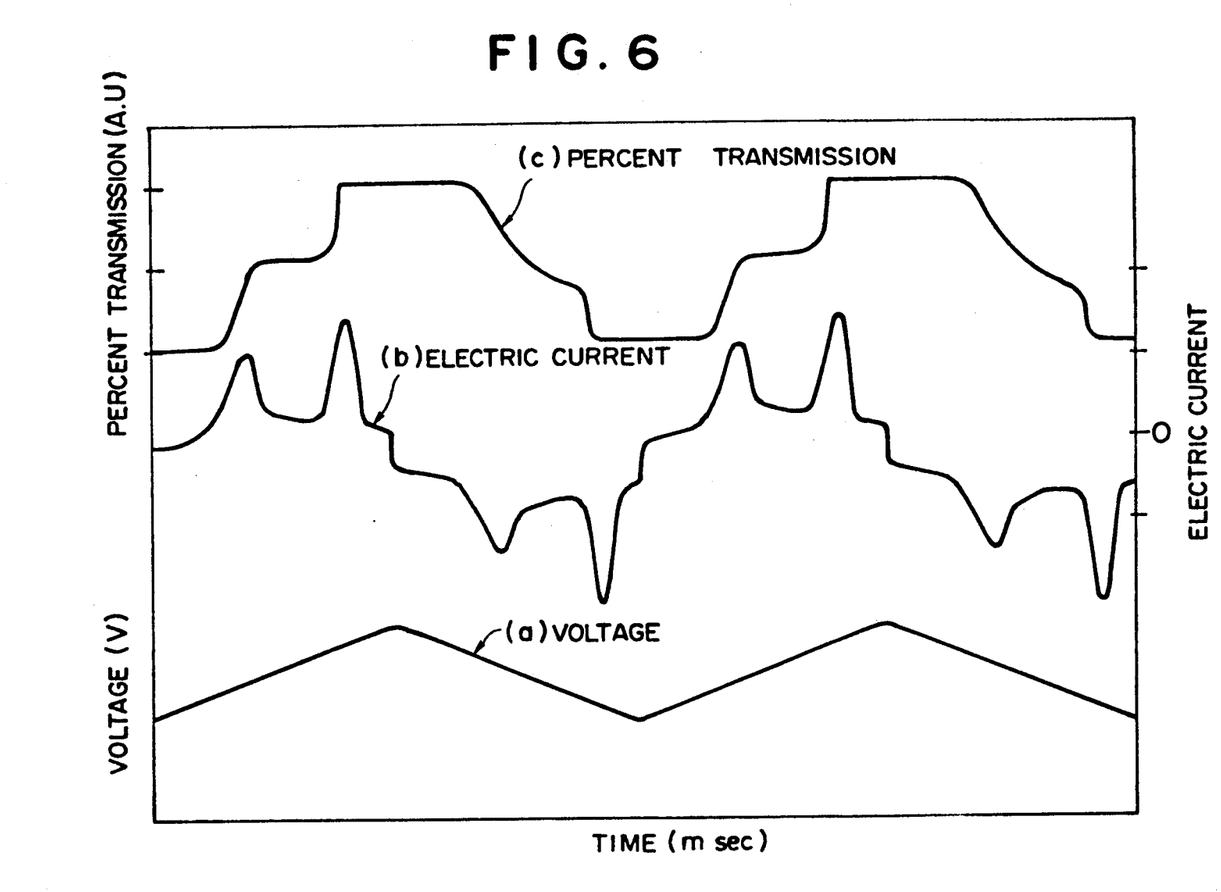
FIG. 6 is tristable state switching of the present compound, wherein (a) is triangular wave voltage applied to a liquid crystal electrooptical element, (b) is polarization reversal current and (c) is change of percent light transmission (transmittance) against the triangular wave voltage(a).

The figure shows change of percent transmission (c) from a dark phase at the minus range of applied voltage to a clear phase at the plus range via a medium phase at the zero range, and the corresponding peaks (b) of switching current peak. Three stable orientation sta-

We claim:
1. Liquid crystal compound of the formula wherein Z is a fluorine-containing alkyl group, m is an integer of 5 to 14, n is an integer of 4 to 12, and * designates a chiral carbon atom, which exhibits S*(3) phase where the liquid crystal compound shows optically tristable states when electric voltage is applied.

2. Liquid crystal compound according to claim 1 which is in a S*(3) phase where the liquid crystal compound shows optically tristable states when electric voltage is applied.

3. Liquid crystal compound according to claim 1, wherein Z is a —CF, group or a —$C_2F_5$ group.

4. Liquid crystal compound according to claim 3 which is in a S*(3) phase where the liquid crystal compound shows optically tristable states when electric voltage is applied.